March 23, 1937.　　L. P. FAUCHER　　2,074,744
BAKERY EQUIPMENT
Filed Jan. 21, 1933　　2 Sheets-Sheet 2
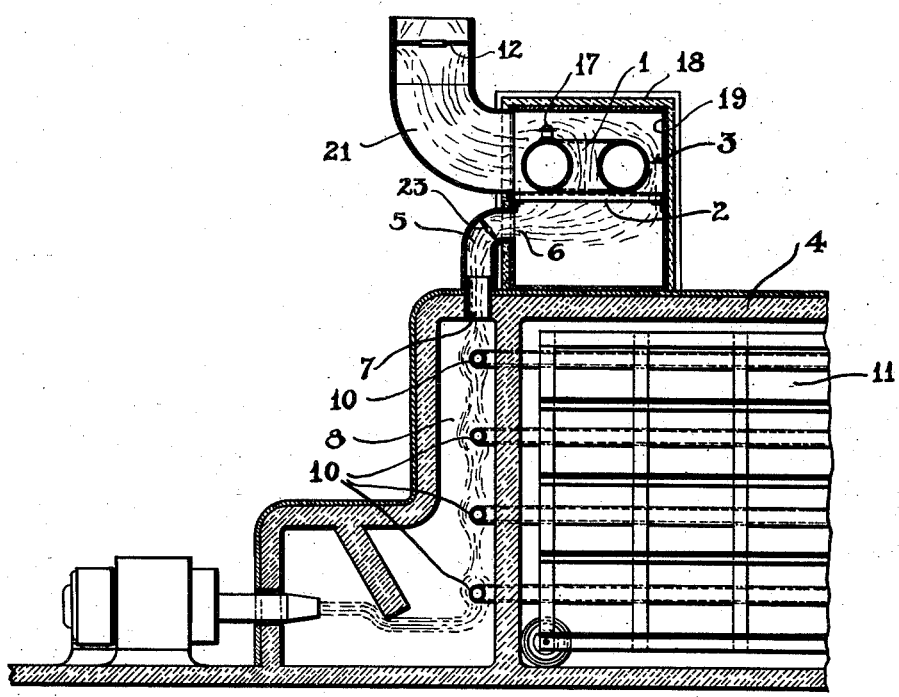
FIG. III
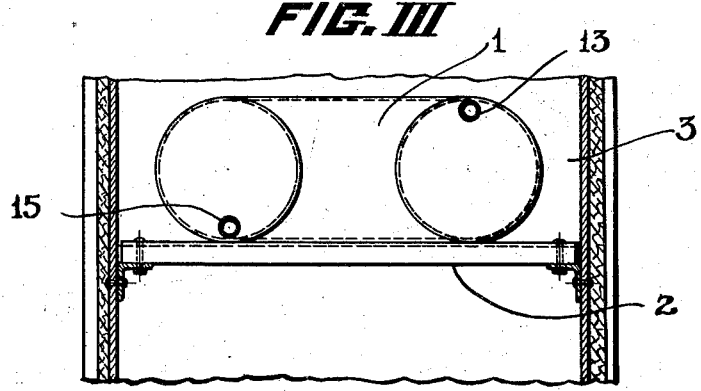
FIG. IV
INVENTOR
Louis P. Faucher.
BY
ATTORNEY Patented Mar. 23, 1937

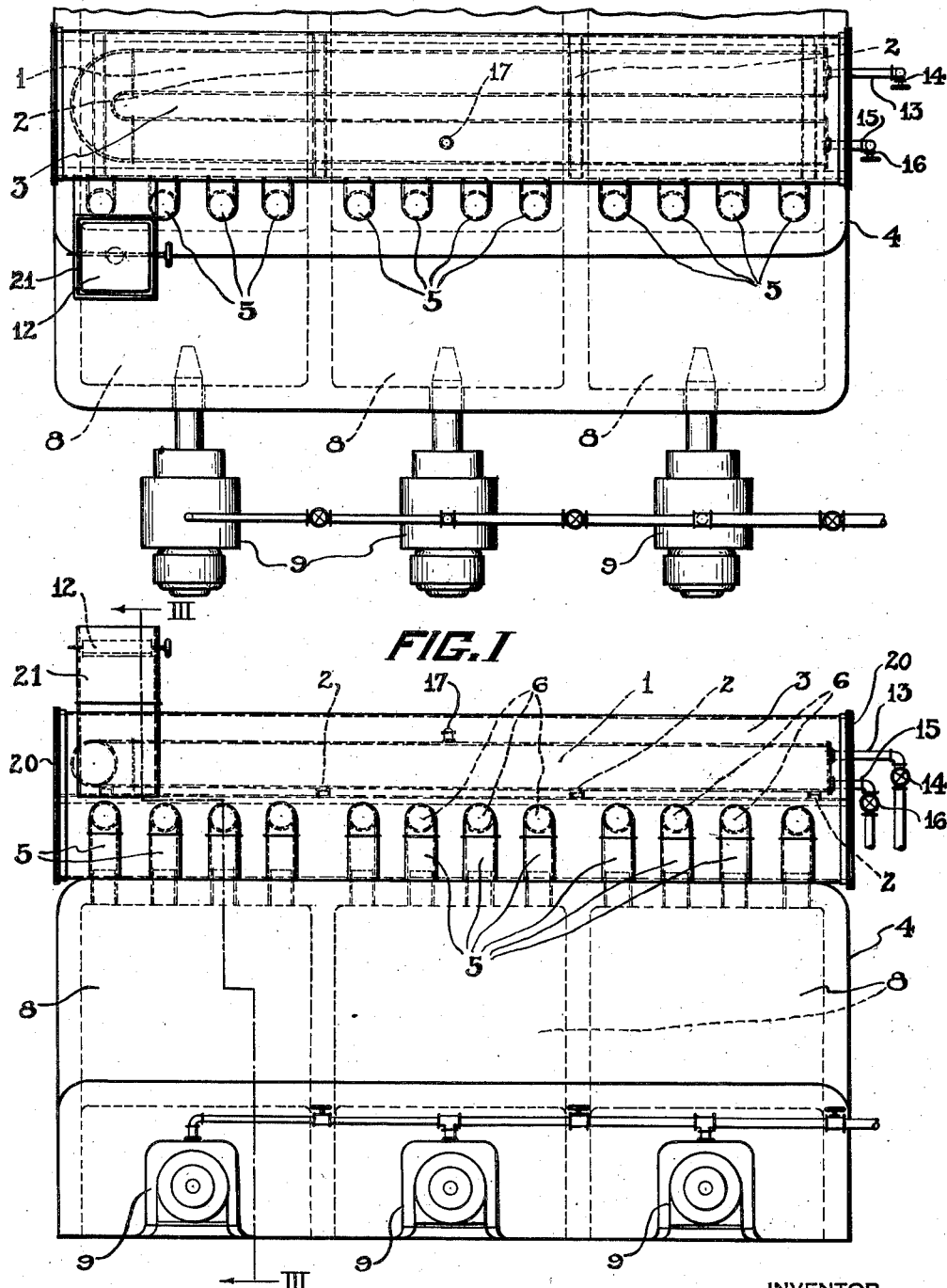

2,074,744

UNITED STATES PATENT OFFICE 2,074,744

BAKERY EQUIPMENT

Louis P. Faucher, North Grosvenor Dale, Conn.

Application January 21, 1933, Serial No. 652,867

2 Claims. (Cl. 107—64)

This invention relates to improvements in bakery equipment and has particular reference to means and method of utilizing waste heat.

One of the principal objects of the invention is to provide means and method of utilizing heat which has hitherto been wasted from the heating unit of a bakery oven for heating a reserve supply of liquid which is in constant use in a bakery.

Another object of the invention is to provide an improved heating device which requires no additional floor space to that utilized by the bake oven.

Another object is to provide means in combination with a bakery oven for transferring heat from the heating unit of said oven to a heating chamber having means therein in which a supply of liquid may be exposed to and heated by the heat in said chamber.

Another object is to provide means in combination with a bakery oven for substantially equally distributing heat from the heating unit of said oven to means internally of a heat storage chamber or compartment whereby means in said chamber or compartment may be heated.

Another object is to provide simple, efficient, and economical means of utilizing heat which has hitherto been wasted.

Other objects and advantages of the invention will become apparent from the following description taken in connection with the accompanying drawings and it will be apparent that many changes may be made in the details of construction, arrangement of parts and methods shown and described without departing from the spirit of the invention as expressed in the accompanying claims. I, therefore, do not wish to be limited to the exact details and methods shown and described as the preferred forms only have been shown by way of illustration.

Referring to the drawings:

Fig. I is a plan view of the device embodying the invention;

Fig. II is a rear elevation of the device shown in Fig. I;

Fig. III is a sectional view taken on the line III—III of Fig. II and looking in the direction indicated by the arrows; and Fig. IV is a fragmentary enlarged end view of the liquid tank and heating chamber.

It has been necessary, in the past in a bakery, to provide separate heating devices for heating the bake ovens, water, milk, etc. These heating devices were not only very costly from the standpoint of purchase and operation, but were very inconvenient and troublesome in that they required constant alteration and cleaning during their operation. One of the greatest detriments of these types of heating devices in the past has been that they required a great amount of floor space, and in a bakery floor space is perhaps most valuable. The heating units as arranged in the past also caused a great amount of heat and fuel to be wasted.

One of the primary objects, therefore, of the present invention is to provide simple, economical and novel means and method of utilizing the heat which has hitherto been lost and which means will not require special attention and will not require extra floor space.

Referring more particularly to the drawings wherein like reference characters designate like parts throughout the several views, the device embodying the invention comprises a heating coil, tank or container 1 mounted on transverse supports 2 within a heat storage chamber 3. The storage chamber 3 is mounted on the top of standard bakery ovens 4 and is provided with a plurality of heat conduits 5 which communicate with openings 6 in the side of the chamber 3 and openings 7 formed in the top of the heat chambers 8 of the ovens. The conduits 5 are adapted to direct the heat from the chambers 8 into the chamber 3 and distribute the said heat substantially equally throughout the length of the coil or container 1. The heat in the chamber 8 of the oven is supplied by one or more heating units 9 of any desired type such as are in common use in bakeries. These heating units are a standard part of bakery ovens and are adapted particularly for heating the coils 10 of the bake chambers 11 of said ovens.

The heat storage chamber 3 is provided adjacent one of its ends with a flue or exhaust 21 which is connected to a chimney, not shown, by means of which the heat in the chamber 3 may be controlled by varying its escape through said flue or exhaust by opening and closing a damper or other means 12 in said flue.

The heating coil, tank or container 1 which is adapted to hold the liquid to be heated is shown as being a U shaped member formed with an inlet 13 adjacent the upper portion of one of its ends. The said inlet is provided with a valve 14 for regulating the flow of liquid. The U shaped member adjacent the lower portion of its opposite end is provided with an outlet 15 having a valve 16. The object of this outlet and inlet valve arrangement is to provide means whereby no pressure will be required to drain the heating coil or container 1 and also to provide means whereby any desired quantity of the liquid may be allowed to flow in said coil or container to be heated. The said coil or container is provided with a suitable safety valve 17 to insure against its becoming over-heated and bursting. The said coil or container is preferably formed of copper, but it is to be understood that it may be formed of any desired material and may be of any shape or size desired.

The walls of the chamber 3 are formed with a coating of any desired insulation or heat retarding material 18 having a metal or other suitable lining 19. The ends 20 of the chamber 3 are closed and are preferably covered with suitable insulation or heat retarding means. If desired, the flues 5 may be covered with heat insulating means.

The method of arranging the said device is as follows:

The heat utilized in heating the coils 10 of the bake ovens 4 passes upwardly through the openings 7 formed in the top of the heat chambers 8 and is directed by the conduits 5 into the heat storage chamber 3. The heat in said chamber is adapted to heat the liquid in the coil or container 1 and the temperature thereof is regulated by the damper control or other means 12 in the flue or exhaust 21. This damper is adapted to hasten or retard the flow of heat out of the chamber 3 into the chimney to which the flue or exhaust 21 is connected.

If desired, suitable heat control means such as a damper 23 may be placed in each of the conduits 5 as shown in Fig. III to regulate the amount of heat going into the chamber 3.

The chambers 8 in the past have been connected directly to the chimney of the bakery and the heat coming from the heating units 9 and coils 10 has heretofore passed directly up the chimney and was therefore wasted. With applicant's improved device this heretofore wasted heat is directed into the heating chamber 3 and is utilized to heat the liquid in the coil or container 1 in said chamber. This unique device is simple and compact and does not require floor space. It obviates the use of a separate heating unit, saves the initial cost and operation thereof and permits the use of the floor space usually occupied by said separate heating units for other purposes.

Attention is directed to the fact that the coil or container 1 is placed on a level above the conduits 5 leading into the chamber so that the heat coming through said conduits will hit the under side of the coil or container 1 and pass upwardly around said coil or container.

From the foregoing description it will be seen that simple, efficient and economical means and method is provided for accomplishing all of the objects and advantages of the invention.

Having described my invention, I claim:

1. A portable liquid heating device for use with a plurality of adjacent aligned bake ovens each having separate aligned compartments containing separate heaters for heating the heat conducting units of each respective oven and each having a ceiling portion formed with a plurality of openings, comprising a heat storage chamber adapted to be positioned across the outer walls of the tops of the bake ovens and above the heater compartments, a liquid containing tank supported internally of the heat storage chamber by rod-like supports and being sealed in said chamber and conveyable therewith as a separate unit independent of the bake ovens.

2. A portable liquid heating device for use with a plurality of adjacent aligned bake ovens each having separate aligned compartments containing separate heaters for heating the heat conducting units of each respective oven and each having a ceiling portion formed with a plurality of openings, comprising a heat storage chamber adapted to be positioned across the outer walls of the tops of the bake ovens and above the heater compartments, a liquid containing tank supported internally of a heat storage chamber in the upper portion thereof and being sealed in said chamber and conveyable therewith as a separate unit independent of the bake ovens, said heat storage chamber having a plurality of spaced openings formed in a side wall thereof and located adjacent the plane of the bottom of the tank and a plurality of heat conduits connecting said openings in the side wall of the heat storage chamber with the openings in each of the compartments having the separate heaters therein whereby the heat of all of said separate compartments will be directed into the heat storage chamber substantially throughout the length of the tank in said chamber, said heat storage chamber having outlet and inlet means extending through an end wall thereof and connected with the tank in said chamber and a flue adjacent one end of the chamber for connecting said chamber to a chimney.

LOUIS P. FAUCHER.